United States Patent [19]

Vennemeyer

[11] Patent Number: 4,946,285
[45] Date of Patent: Aug. 7, 1990

[54] BOWL SCRAPER ATTACHMENT FOR PLANETARY FOOD MIXER

[75] Inventor: Chris A. Vennemeyer, Vandalia, Ohio
[73] Assignee: Hobart Corporation, Troy, Ohio
[21] Appl. No.: 490,908
[22] Filed: Mar. 8, 1990
[51] Int. Cl.⁵ ............................................. B01F 9/22
[52] U.S. Cl. ..................................... 366/288; 366/309
[58] Field of Search ............... 366/309, 311, 312, 313, 366/97, 98, 100, 287, 288; 99/348

[56] References Cited

U.S. PATENT DOCUMENTS

| | | | |
|---|---|---|---|
| 1,674,903 | 6/1928 | Johnston | 366/288 |
| 1,872,004 | 8/1932 | Rataiezak | 366/309 |
| 2,610,269 | 9/1952 | Guilder | 366/288 |
| 2,651,582 | 9/1953 | Courtney | 366/309 |
| 4,854,717 | 8/1989 | Crane | 366/197 |

Primary Examiner—Robert W. Jenkins
Attorney, Agent, or Firm—Russell L. McIlwain; William Weigl

[57] ABSTRACT

A food mixer of the planetary type has a detachable bowl scraper mounted on a supporting member for orbiting the beater. The mounting means comprises a bracket fastened to the main drive shaft of the mixer by means of a single bolt. The scraper includes an arm which is detachably mounted to the bracket. The bracket is restrained against angular movement about the bolt and the scraper arm is restrained against relative movement about the bracket when in operative position.

4 Claims, 1 Drawing Sheet

BOWL SCRAPER ATTACHMENT FOR PLANETARY FOOD MIXER

This invention relates generally to a food mixer of the type for making large batches of batter such as a cake mix. Typically, such a food mixer has a vertical stand supported on legs, a horizontal cantilevered mixing head, and a downwardly-directed beater. An upwardly-facing bowl is mounted on the stand and is movable between a lower position into which ingredients are first placed and an upper mixing position in which the beater is in contact with the food. Specifically, this invention relates to a simple and inexpensive scraper attachment which can be removably mounted on a mechanism for supporting the beater so as to scrape the inner surface of the bowl and cause the batter to be moved inwardly of the bowl for contact and mixing by the beater.

BACKGROUND OF THE INVENTION

Commercial food mixers such as those used in bakeries are frequently of the planetary-type, i.e., a cylindrical bowl is stationarily-supported and a rotating beater moves in orbital fashion within the bowl so that the beater moves close to the cylindrical wall in its orbital passes around the bowl. For many types of batters such as cake mixes, particularly at the outset when flour is still in a dry or partially dry state, it is ordinarily necessary to stop the mixing action and use a hand scraper to get the dry ingredients along the upper side walls of the bowl turned back into the product. It has been known to attach scraper blades for movement about the bowl as the beater makes it orbital path. Also known is the type of device which performs a scraping and folding action, but is mounted concentrically with the bowl. In the latter device, the portion which performs the scraping is the main mixer, for "folding" biscuit mixes, souffles, etc. An example of the latter type of device is shown in U.S. Pat. No. 4,854,717 issued to H. Crane.

SUMMARY OF THE INVENTION

This invention pertains to a simple mounting means for attaching a bowl scraper to a planetary mixer powerhead to cause it to pass around the inner cylindrical surface of the bowl, with the scraper preferably being mounted diametrically opposite from the beater shaft so that the scraper is out of range of contact by the beater. The attachment means is one that enables existing machines of a design such as that shown in the drawings to be simply converted in the field, without the necessity of performing any machining or other modification to such existing machines. One of the most prominent of such mixers is sold throughout the world under the trademark "HOBART". The basic driving mechanism of certain models of this successful machine has been relatively unchanged for over 50 years. Having long been in the public domain, the designs have been imitated and in some instances directly copied by domestic and foreign manufacturers.

The attaching means of the present invention provides a very simple and inexpensive structure easily adapting a bowl scraper to a significant number of existing machines, without requiring anything more than changing a few parts and attaching a unique mounting bracket. The structure is likewise suited for sale with new mixers as an attachment which can be selectively used when the particular product being mixed so requires.

IN THE DRAWINGS

PREFERRED EMBODIMENT OF THE INVENTION

Figure 1:
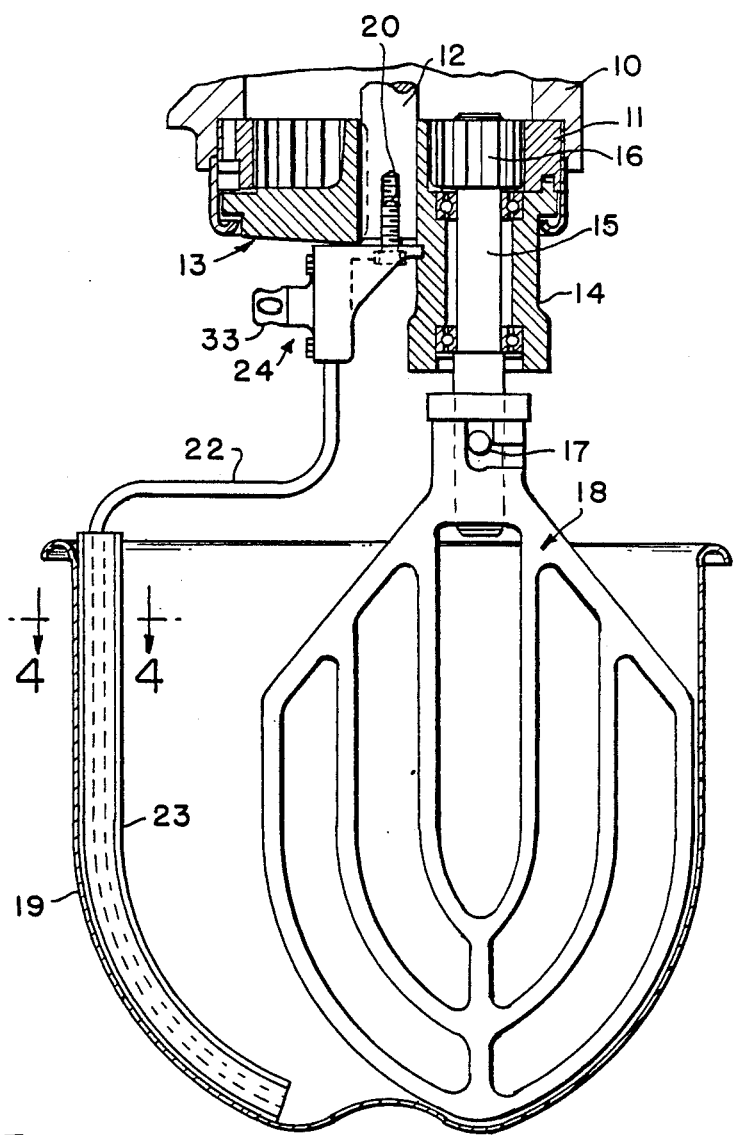
FIG. 1 is a cross-sectional elevational view of a portion of a food mixer of the type aforementioned, with the improvement of this invention mounted in operative position.

FIG. 1 shows only a section of a powerhead portion of a food mixer of the type previously described. A powerhead casting 10 has fixed thereto an internal ring gear 11. A drive shaft 12 extends downwardly from the powerhead and has keyed for rotation therewith a rotatable supporting member 13 in the form of a casting. The member 13 includes a depending cylindrical portion 14 for journaling a beater shaft 15. At its upper end, the shaft 15 carries a sun gear 16 and at the lower end, a cross pin drive 17. Pin 17 is received in a beater 18 in conventional bayonet fashion for rotation with the shaft 15. As drive shaft 12 rotates member 13, the shaft 15 which is offset therefrom moves in an orbit so as to present the edge of the rotating beater 18 around the bowl 19 in close proximity thereto. Rotation of shaft 15 is caused by sun gear 16 meshing with the internal ring gear 11 so as to rotate beater 18 therewith during orbiting.

All of the foregoing is well-known in the art, being essentially the design of a large number of models of such mixers known throughout the world. Many models of these well-known mixers have the supporting member 13 fastened to the underside of the powerhead by means of a single bolt 20 and a retaining washer (not shown, since it has been removed to accommodate this invention). The member 13 and drive shaft 12 are keyed together. The washer and bolt 20 serve to capture the supporting member 13 and retain it upwardly against the end of the shaft 12. The removed washer is circular with one edge having an arc of the same radius as shown at 21 in FIG. 3. The washer fits against a cylindrical surface of the depending portion 14 which journals the beater shaft 15.

Figure 2:
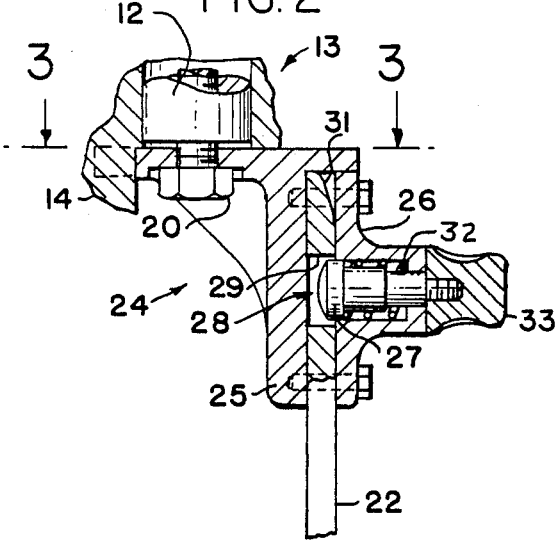
FIG. 2 is an enlarged vertical cross section through a preferred form of means for attaching the bowl scraper to the mixer of FIG. 1, and is shown in a position 180° across the bowl from the position illustrated in FIG. 1.
Figure 3:
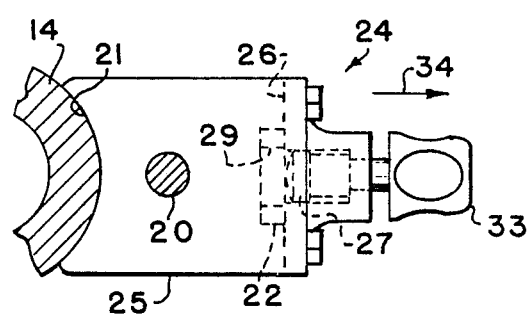
FIG. 3 is a view looking downwardly along lines 3—3 of FIG. 2.

A key feature of my invention is to enable simple removal of the bolt 20 and the aforementioned washer and replacement of the washer by the structure shown in enlarged fashion in FIGS. 2 and 3 to attach a scraper arm 22 and scraper 23 for the purposes mentioned earlier.

Bracket means assembly 24 comprises an inverted L-shaped portion 25 and a bossed plate 26 supporting a male portion 27 of a detent means 28. The portion 27 corresponds to a female opening 29 in the scraper arm 22. The horizontal section of the L-shaped portion 25 takes the place of the removed retaining washer which exists on present field machines of this style. Bolt 20 is first removed from shaft 12, the standard retaining washer removed and set aside, and the assembly 24 attached thereto by means of bolt 20. The radius 21 shown in FIG. 3 is the same as that on the removed retaining washer. Therefore, when the single bolt 20 is fastened to the drive shaft 12, radius 21 will anchor the bracket means assembly 24 against angular rotation about the bolt 20. The assembly 24 is the sole means attached to the underside of the supporting member 13 in this particular design, and becomes a permanent part of the mixer.

Figure 4:
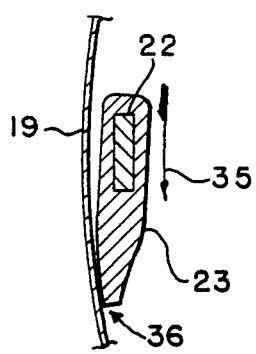
FIG. 4 is an enlarged, horizontal cross-sectional view of the scraper arm and scraper, and is taken generally along lines 4—4 of FIG. 1.

The scraper arm 22 and scraper 23 are relatively fixed to each other. The scraper 23 is an extrusion which may be made of a urethane elastomeric food-compatible material. It slips firmly onto the lower end of the arm 22 until it is at the proper depth as shown in FIG. 1. The arm 22 is rectangular in cross section and fits snugly into the scraper 23 as shown in FIG. 4. When assembled, they constitute a single piece, the upper end of which is merely inserted into the bracket means assembly 24, snaps firmly into place, and is retained there while in use. Male portion 27 of the detent means 28 has a slightly rounded button head which acts as a cam surface cooperating with an angled camming surface 31 at the upper end of the arm 22. It should be understood that with the arm 22 removed from the assembly 24 and being shoved vertically to the position occupied in FIG. 2, the camming surface 31 would engage the button head and compress a spring 32 until the the female opening 29 passes beyond the male portion 27. Then, as the arm 22 reaches its uppermost position, the portion 27 snaps into the opening 29 to latch the arm 22 and its scraper 23 in their scraping position in which they return product from the inner wall surfaces of the bowl 19 back into the product being mixed. This insertion normally takes place while the bowl 19 is in a lowered position for receiving ingredients to be mixed in preparation for a mixing job. With the bowl down, the beater 18 and scraper 23 can be installed vertically. The bowl is then raised into the mixing position shown in FIG. 1 at which time mixing and scraping action can commence. When the job is done, the bowl with the mixed batch of product is lowered and beater 18 and scraper 23 can be removed and taken to a remote location for cleaning.

Removal of the arm 22 is accomplished by the operator grasping a tapered knob 33 mounted on a flat boss portion of the plate 26. Knob 33 is provided with finger depressions to enable firm gripping by the operator when releasing the arm 22 for removal. The boss receives the male portion 27 and spring 32 of the detent means 28. By pulling rightwardly in the direction of arrow 34 with one hand to the position shown in FIG. 3, the operator can then pull downwardly with the other hand on scraper arm 22 to remove the arm. The knob 33 can be released as soon as the male portion 27 and female opening 29 of the detent means 28 are no longer in alignment.

Referring now to FIG. 4, it can be seen that the elastomeric property of the scraper 23 allows it to be pressed against the inner cylindrical surface of the bowl 19 as the arm 22 moves in the direction of the arrow 35. This provides firm edge contact at 36 to provide a good scraping action during the mixing operation.

Cross-sectional dimensions of the arm 22 and the mating opening in the bracket means assembly 24 are preferably held to reasonably close tolerances to lock the arm 22 firmly in position. However, even if some slight looseness were present, this would be counteracted by the scraping pressure against the bowl as shown in FIG. 4.

Various modifications may be made without departing from the spirit and scope of my invention. Other forms of the bracket means can be designed and attached by the single bolt 20 in a fashion to sturdily support the scraper arm.

Having described my invention, I claim:

1. In a food mixer having an upwardly-opening stationary cylindrical bowl, a depending beater shaft rotating on a vertical axis and a vertical depending drive shaft coaxial with the bowl and about which the beater shaft orbits when the bowl is in position to receive and contain product during mixing, said mixer further including means for driving said drive shaft at a preselected speed, a supporting member supported on said drive shaft and rotatably mounting said beater shaft radially-outward therefrom, external gear means on said beater shaft and cooperating stationary internal gear means on said food mixer for rotating the beater shaft at a speed higher than said preselected speed in response to rotation of said supporting member, and food beater means detachably mounted to said beater shaft, the improvement comprising:
    bowl scraper means removably mounted for rotation with said supporting member for scraping food product being mixed from the inner surface of said bowl and returning it to the path of orbital action and rotation of said beater means, said bowl scraper means including:
    bracket means mounted at the underside of said supporting member and a single, upwardly-directed bolt for fastening said bracket means to said drive shaft;
    cooperating means on said bracket means and said supporting member restraining said bracket means against angular movement about said single bolt;
    a radially-outwardly-and-downwardly depending scraper arm having a downwardly-extending scraper blade at its remote end for essentially vertically contacting the inner surface of said bowl; and
    means detachably mounting said scraper arm to said bracket means.

2. A food mixer according to claim 1 wherein said bracket is essentially of an inverted L-shape with a horizontal portion held to said drive shaft by said bolt and a depending portion offset from said shaft,
    a vertical slot in said depending portion for receiving an upper end of said arm, and
    cooperating male and female detent means on said upper end of said arm and in said vertical slot for retaining said arm to said bracket means when the scraper arm is in operative position.

3. A food mixer according to claim 2 wherein the male portion of said detent means is mounted on said bracket means, is spring-biased inwardly of said slot and is manually-movable outwardly of said slot, and wherein said upper end of said arm contains the female portion of said detent means.

4. A food mixer according to claim 3 wherein the end of said arm which is insertable into said slot for installation into said bracket means and the portion of the male detent comprise cooperating cam surfaces enabling said arm to be inserted and the male portion of the detent means to be moved outwardly of the slot against the spring bias until said male and female portions of the detent means are aligned and engage.

* * * * *